US006346061B1

(12) United States Patent
Olsson

(10) Patent No.: US 6,346,061 B1
(45) Date of Patent: Feb. 12, 2002

(54) DEVICE AT A WHEEL FOR A WHEELCHAIR

(76) Inventor: Tommy Olsson, Söderby, S-335 91 Gnosjo (SE)

( * ) Notice: Subject to any disclaimer, the term of this patent is extended or adjusted under 35 U.S.C. 154(b) by 0 days.

(21) Appl. No.: 09/509,972

(22) PCT Filed: Sep. 30, 1998

(86) PCT No.: PCT/SE98/01764

§ 371 Date: Mar. 31, 2000

§ 102(e) Date: Mar. 31, 2000

(87) PCT Pub. No.: WO99/17980

PCT Pub. Date: Apr. 15, 1999

(30) Foreign Application Priority Data

Oct. 2, 1997 (SE) .............................................. 9703627

(51) Int. Cl.[7] .......................... B62M 1/14; B62M 11/16

(52) U.S. Cl. ..................... 475/331; 280/250.1; 301/122

(58) Field of Search ...................... 280/250.1; 301/122; 192/217.4; 475/331; 384/295, 441, 510, 511, 559, 561

(56) References Cited

U.S. PATENT DOCUMENTS 3,894,743 A * 7/1975 Hiroumi ................. 384/511 X
4,679,862 A * 7/1987 Luo ....................... 301/122 X
4,727,965 A * 3/1988 Zach et al. .............. 192/217.4
5,486,016 A * 1/1996 Godin et al. ............. 280/250.1
5,727,850 A * 3/1998 Masclet .................. 301/122 X

FOREIGN PATENT DOCUMENTS

WO WO 94/20323 * 9/1994
WO WO 96/20866 * 7/1996

* cited by examiner

*Primary Examiner*—Rodney H Bonck
(74) *Attorney, Agent, or Firm*—Orum & Roth

(57) ABSTRACT

The invention relates to an arrangement for a wheel for a wheelchair comprising a planetary gear integrated with the aforementioned wheelchair wheel. A sun wheel, planet wheel and ring wheel incorporated in the gear are accommodated in a hub comprising a hub inner part and a hub outer part, which parts are rotatably supported relative to one another, are carried by a main shaft capable of attachment to the wheelchair. The aforementioned hub parts are supported by means of bearing devices acting around the periphery of the hub, which devices are so arranged on the one hand as to support the hub parts radially relative to one another, and are so arranged on the other hand as to provide axial locking of the hub parts relative to one another. In accordance with the invention, the bearing device is formed from a number of grooves extending around the periphery of said hub parts inside which grooves rolling devices or a plain bearing component are so arranged as to act. The aforementioned radial grooves are arranged directly in line with one another on the internal envelope surface of the outer part of the hub and on the external envelope surface of the inner part of the hub when the hub parts are assembled to form a wheelchair wheel hub.

10 Claims, 7 Drawing Sheets

FIG. 5A
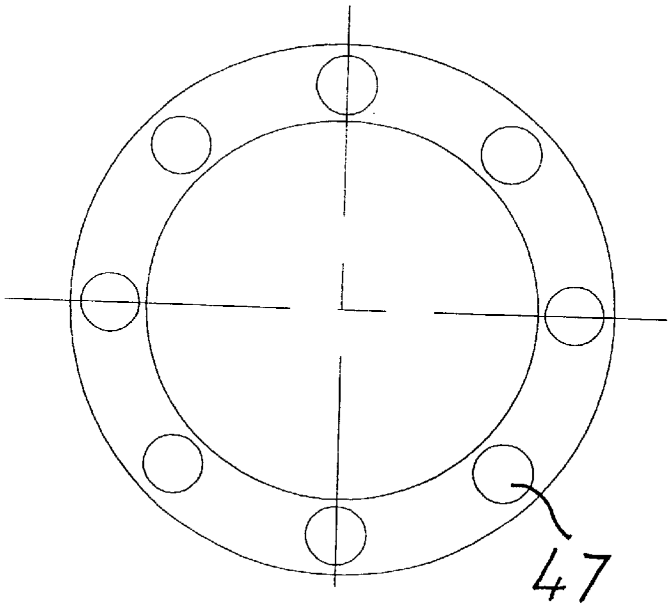
FIG. 5
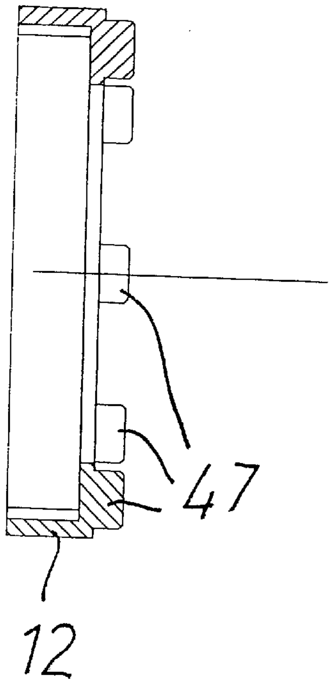
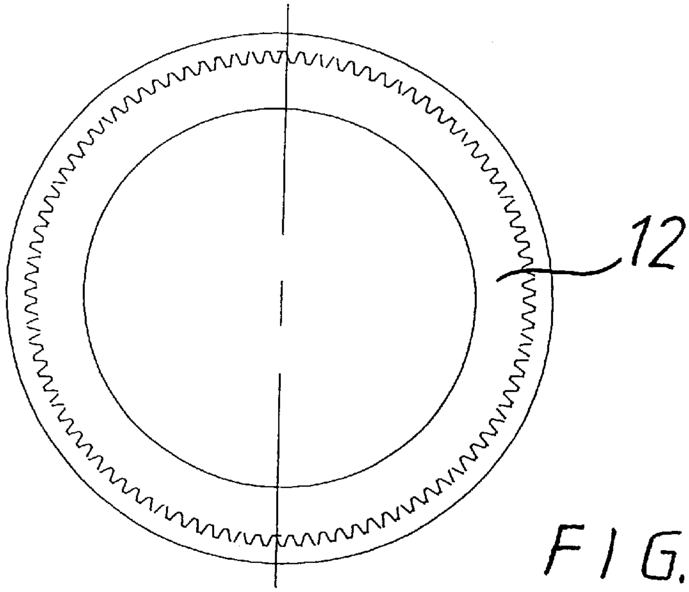
FIG. 5B

DEVICE AT A WHEEL FOR A WHEELCHAIR

The present invention relates to an arrangement for a wheel for a wheelchair, which comprises a planetary gear integrated with the aforementioned wheelchair wheel, and that a sun wheel, planet wheel and ring wheel incorporated in the gear are accommodated in a hub comprising a hub inner part and a hub outer part, which parts are rotatably supported relative to one another, and are carried by a main shaft capable of attachment to the wheelchair, in conjunction with which the aforementioned hub parts are supported by means of hearing devices acting around the periphery of the hub, which devices are so arranged on the one hand as to support the hub parts radially relative to one another, and on the other hand as to provide axial locking of the hub parts relative to one another.

The arrangement of gears on wheelchairs, in particular planetary gears is not so commonly established. Previously disclosed solutions are complicated and are formed from a number of parts, each of which is difficult to produce, because several elements are included in each part, which also makes the gear expensive to produce. The support and locking of the constituent parts are thus also complicated.

The arrangement for a wheel for a wheelchair previously disclosed through WO 94/20323 A1 comprises a bearing formed from conventional roller bearings that are inserted between internal shafts and an external cage. The assembly and construction of this previously disclosed bearing is complicated and not so simple, effective and economical.

The principal object of the present invention is thus, in the first instance, to identify an appropriate solution that is both simple to produce and apply and is not too costly to implement.

Said object is achieved by means of an arrangement in accordance with the present invention, which is characterized essentially in that the bearing device is formed from a number of grooves extending around the periphery of said hub parts, inside which grooves rolling devices or a plain bearing component are so accommodated as to act, in conjunction with which the aforementioned radial grooves are arranged directly in line with one another on the internal envelope surface of the outer part of the hub and on the external envelope surface of the inner part of the hub when the hub parts are assembled to form a wheelchair wheel hub.

The invention is described below as a preferred illustrative embodiment with reference to the accompanying drawings, in which:

FIG. 5 shows a sectioned view of a ring wheel included in the gear;

FIG. 5A shows the ring wheel viewed from one side;

FIG. 5B shows the ring wheel viewed from the opposite side;

Figure 1:
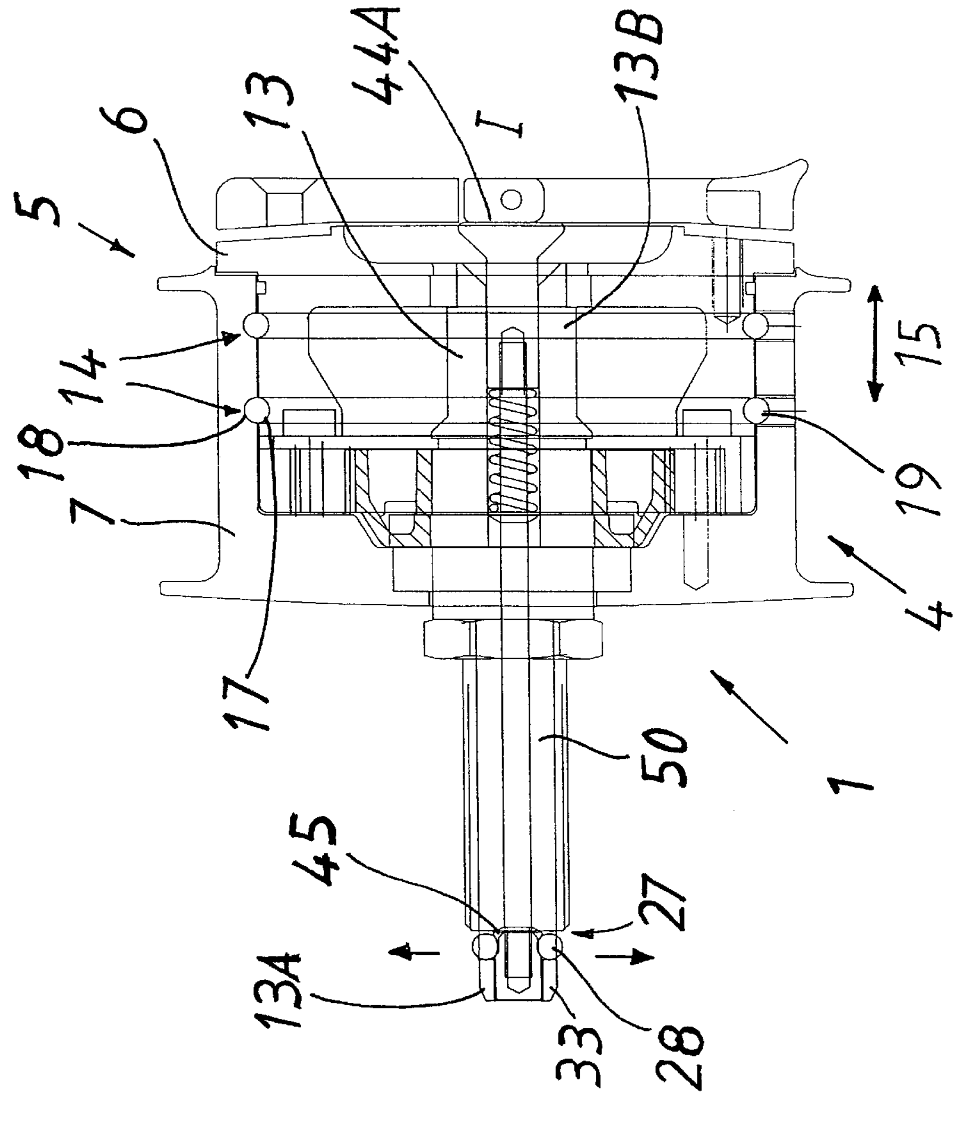
FIG. 1 shows a cross-sectional view of a wheelchair gear in accordance with the invention in its assembled state.
Figure 2:
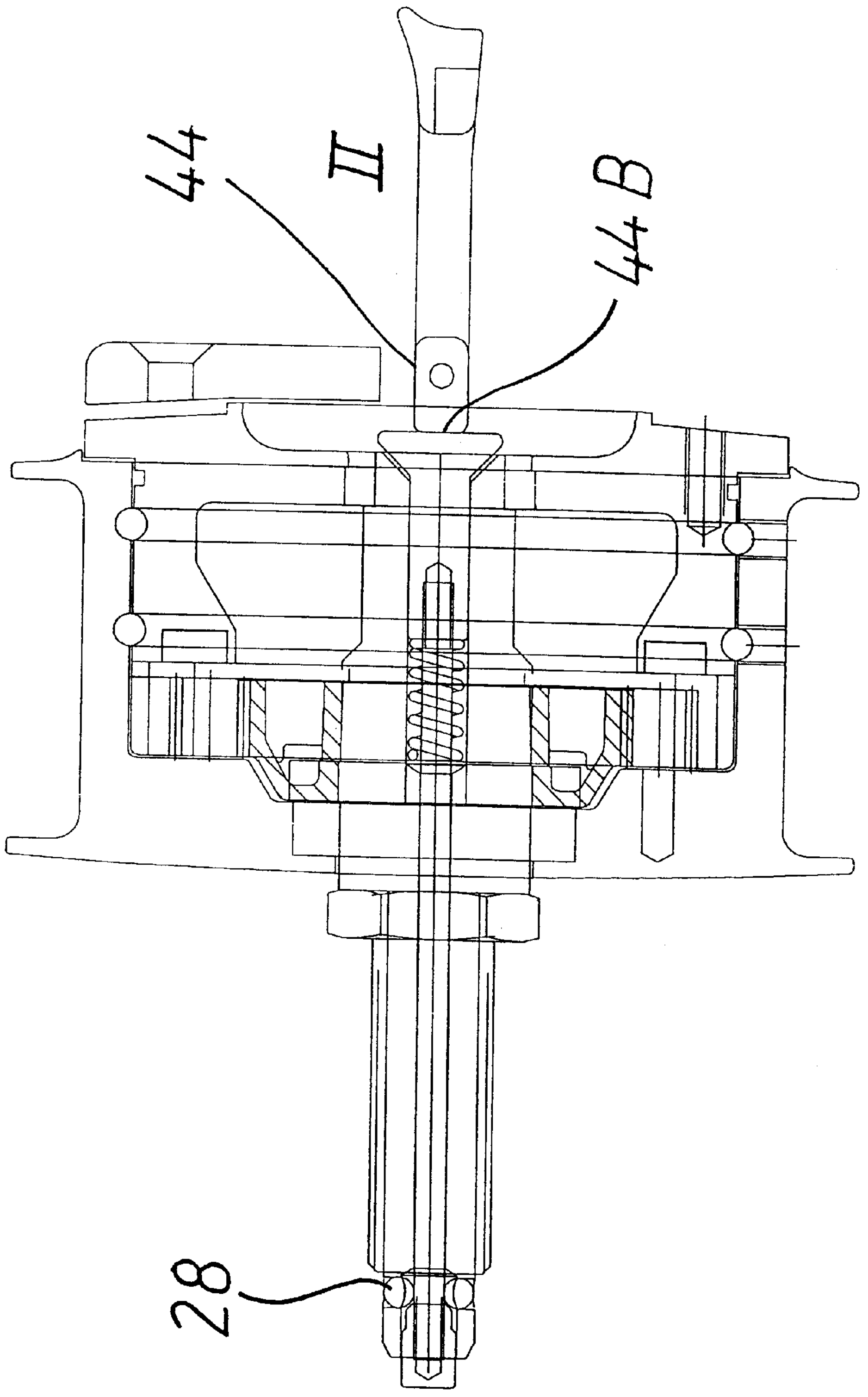
FIG. 2 shows the gear in a connecting state enabling it to be connected detachably to a wheelchair.

An,arrangement 1 for a wheel 2 made of a metal and/or a plastic material for a wheelchair 3, which wheel 2 comprises a planetary gear 4 that is integrated with the aforementioned wheelchair wheel 2, has the gear 4 accommodated enclosed within the hub 5 in question of the wheelchair wheel 2. More specifically, the aforementioned hub 5 comprises a hub inner part 6 and a hub outer part 7, which hub parts 6, 7 are supported so that they are rotatable relative to one another. The constituent sun wheel 10, planet wheel 11 and ring wheel 12, which are carried by a main shaft 13 capable of attachment to the wheelchair 3, are accommodated in the gear 4 inside a space 8, 9 therein. In accordance with the invention, the aforementioned hub parts 6,7 are supported by means of supporting devices 14 acting around the periphery of the hub, which devices are so arranged on the one hand as to support the hub parts 6,7 radially relative to one another, and on the other hand as to achieve axial 15 locking of the hub parts 6,7 to prevent them from moving laterally relative to one another. The supporting device 14 is formed from a number of external and internal grooves 17,18 extending around the periphery 16 of said hub parts 6,7, in which grooves rolling devices 19 or a plain bearing component (not shown) are so accommodated as to act in such a way as to achieve the desired function as outlined above. More specifically, at least one radial groove 18 is arranged on the internal envelope surface 20 of the outer part 7 of the hub, and at least one radial groove 17 is arranged on the external envelope surface 21 of the inner part 6 of the hub, so that they are in direct alignment with one another when the hub parts 6, 7 are assembled together, as shown in FIG. 1, to form a wheelchair wheel hub 5.

A large number of balls 19 is so arranged in the aforementioned grooves 17,18 as to be accommodated in order to be capable of rolling in a long row and thus of functioning as a combined bearing and locking device.

In order to achieve an even more stable function, pairs of grooves 17,17,18,18 can be arranged axially displaced from one another, for example as shown in the drawings.

In order to permit the grooves 17,18 to be filled with balls 19, rollers or other rolling devices or a sliding bearing component of some kind, a passage 22 in the form of a hole is present in the hub in its hub cuter part 7, in conjunction with which the balls 19 can be inserted through the provided hole 22, which extends through the material 23 of the outer part 7 of the hub, as far as the area 24 directly in line with a groove 18 therein, before they are carried onwards to fill the entire groove for its full length. The aforementioned hole 22, which extends axially, is preferably threaded 25 to enable it to accept a threaded plug 26 therein, thereby closing the hole 22, or else a suitable plug can be secured with an appropriate adhesive.

One variant with regard to the insertion of a sliding bearing component in the groove is for a flexible plastic rod to be capable of being accommodated in the aforementioned groove after first having been inserted via a tangential hole therein.

Figure 3:
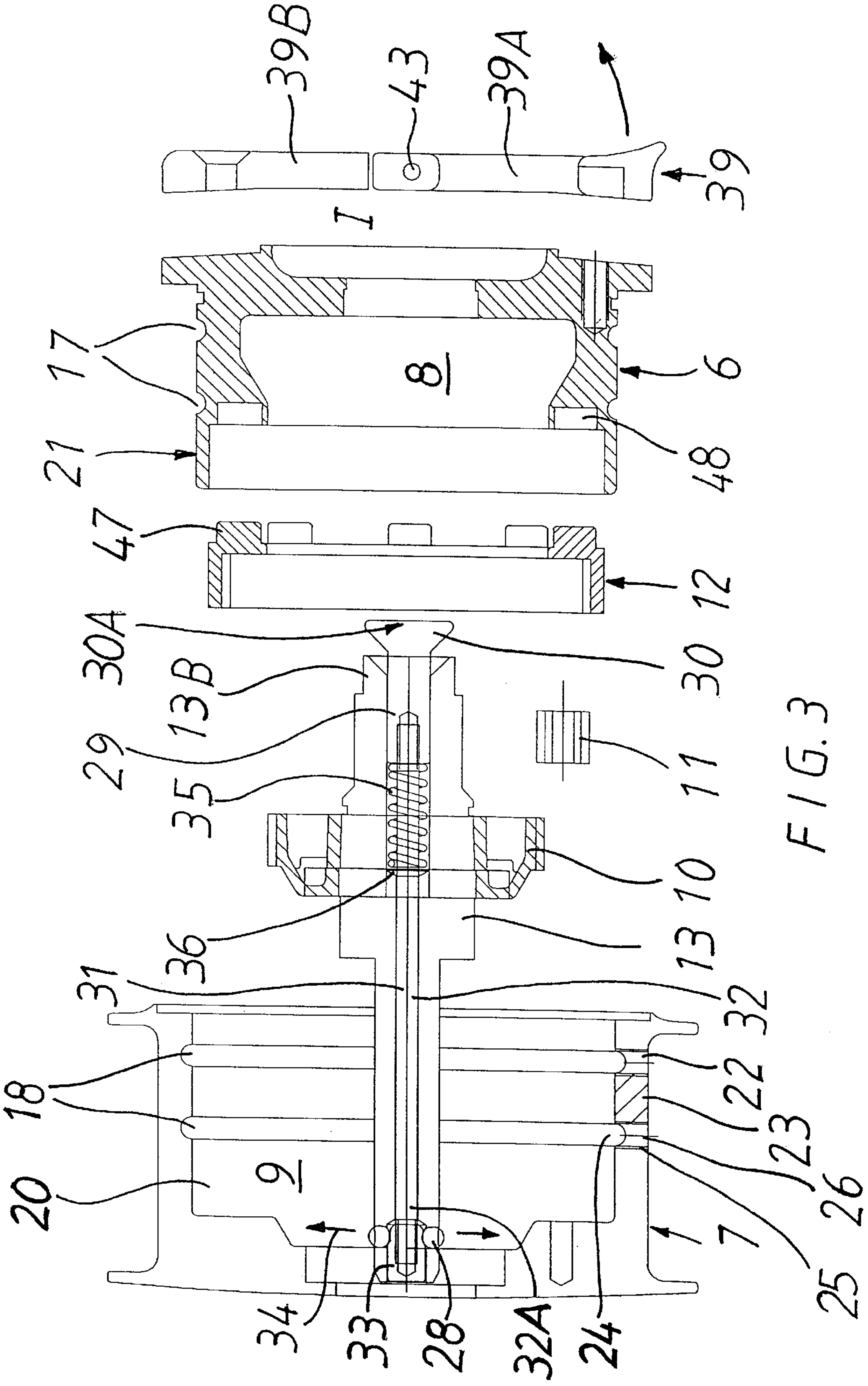
FIG. 3 shows an exploded view of the entire gear.
Figure 4:
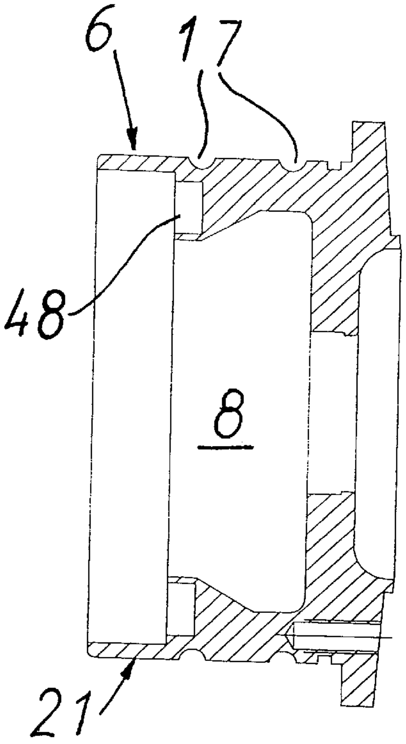
FIG. 4 shows a sectioned view of an inner hub part included in the gear.
Figure 4A:
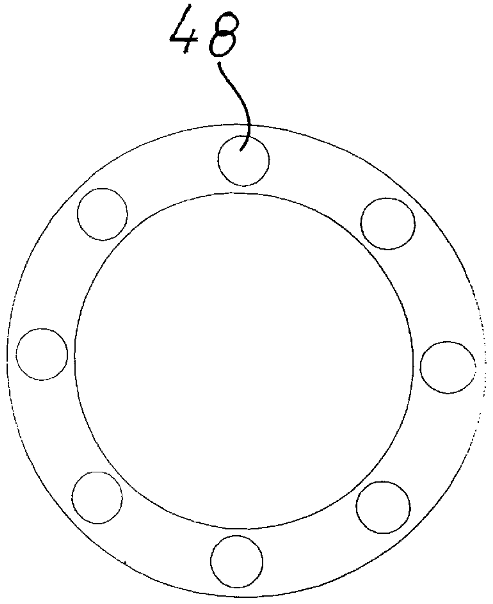
FIG. 4A shows a part of the inner part of the hub viewed from one side.
Figure 4B:
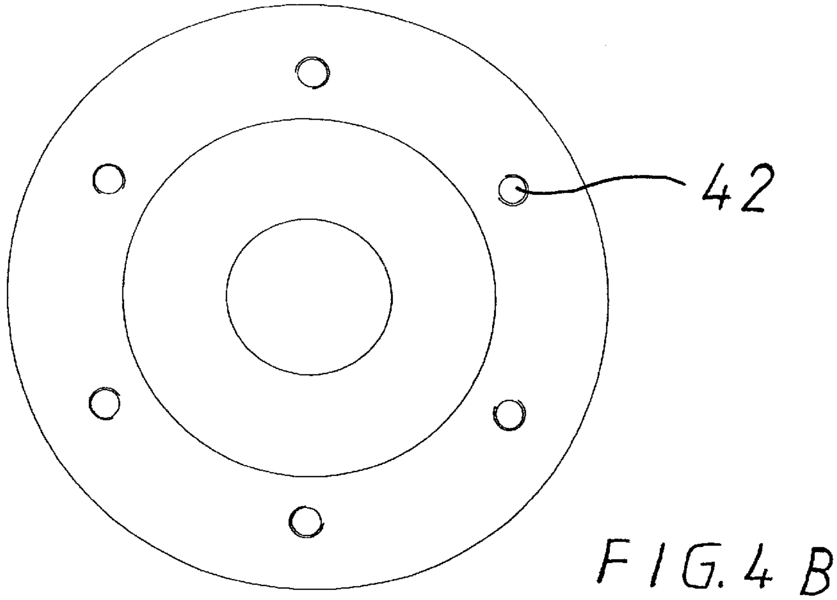
FIG. 4B shows part of the inner part of the hub viewed from the opposite side.
Figure 6:
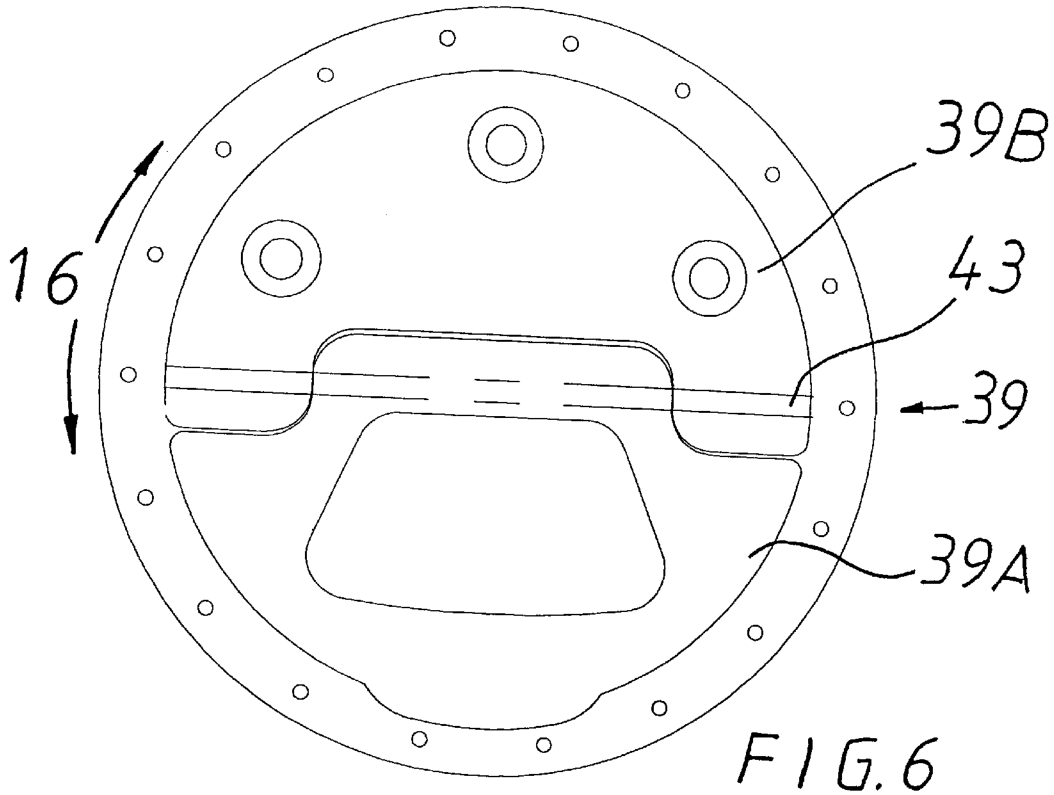
FIG. 6 shows the gear viewed from one side shoving a connecting part of the gear.
Figure 7:
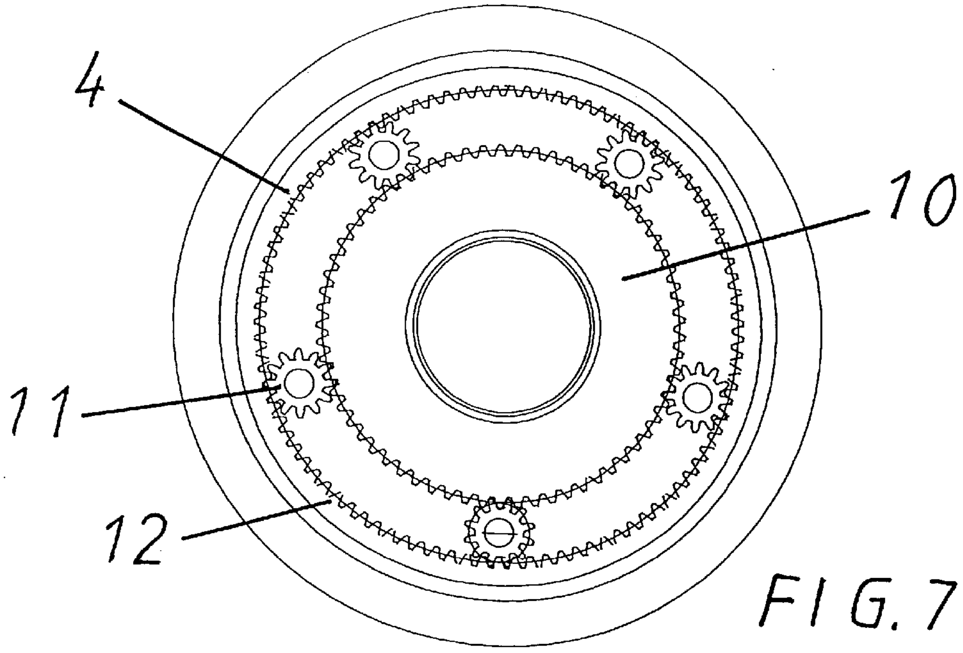
FIG. 7 shows a sectioned view of the gear in the area of all of its gear wheels.
Figure 8:
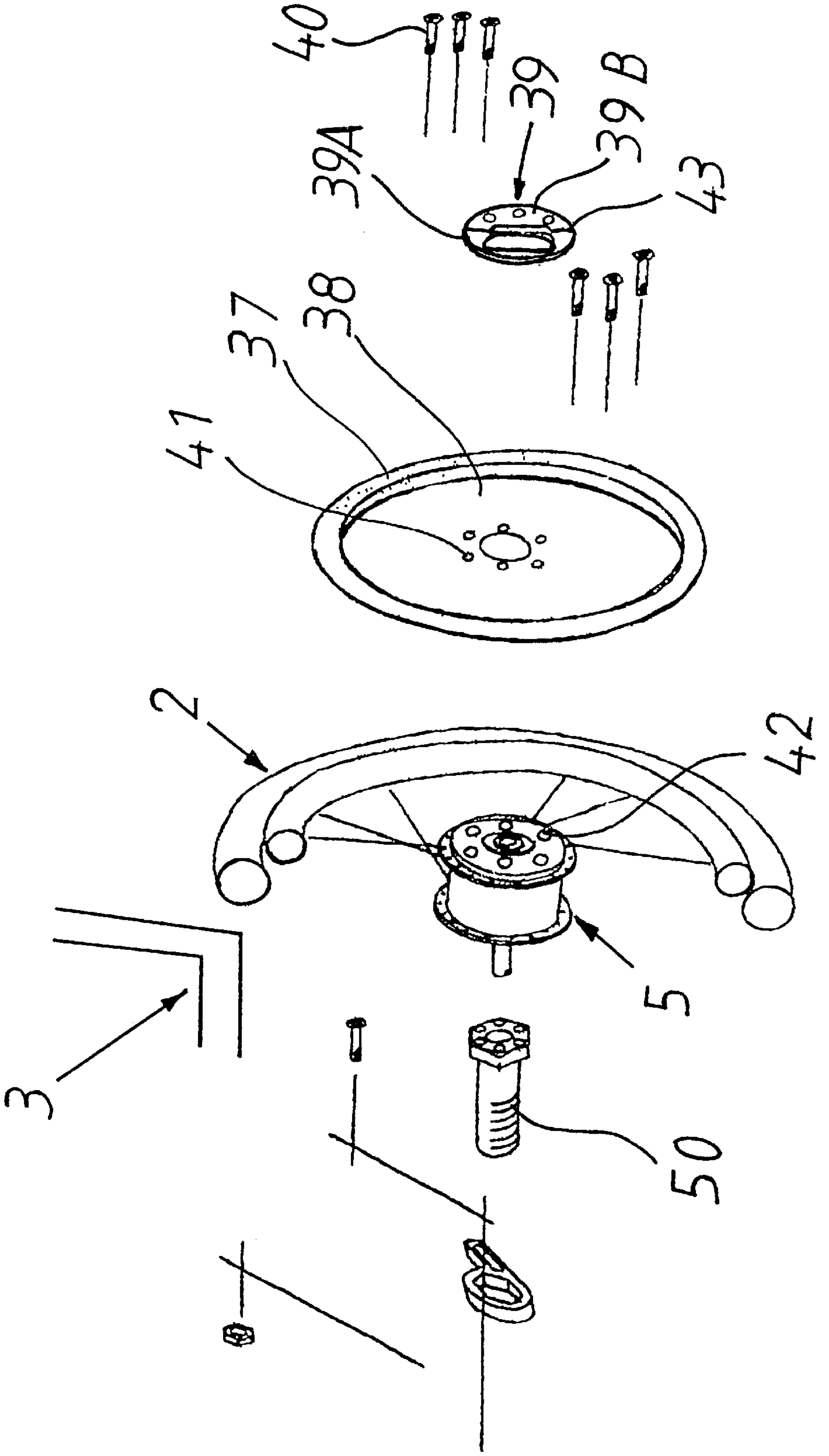
FIG. 8 shows a schematic exploded view of a wheel arrangement with the gear included therein.

The aforementioned gear-equipped hub is easy to assemble, as can be appreciated from FIG. 3, for example, in the sense that the parts can be positioned in a direction facing away from the side of the various parts on the main shaft 13, which in a previously disclosed fashion comprises a lock 27 in the form of a number of balls 28 at its one end 13A enabling it to be locked securely on a wheelchair 3 by allowing the balls 28, in the locked position, to be moved radially outwards away from the shaft 13 and, in the connected position, to be moved axially inwards towards the shaft and accommodated therein. At the opposite end 13B of the shaft 13, a hub bolt 29 with a conical heads 30 is capable of being screwed securely to an actuating rod 32 capable of being accommodated in an inner transcurrent hole 31 inside the shaft, which rod is connected at its outer end 32A to a thickened part 33 that causes the balls 28 to be displaced radially 34. A spring 35 is passed onto the actuating rod 32 and makes contact with one of its ends against a stop 36, and with its other end against the hub bolt 29. Outside the hub 5 and a wheel cover disc 38 provided with a driving ring 37, an actuating mechanism 39 provided with a handle 39A for the aforementioned hub bolt 29 is screwed securely by means of a screw 40 in a suitable screw hole 41,42. The handle 39A, which can be formed by a ring-shaped carrying sling for the wheel 2, to enable the wheel 2 to be carried by it, is pivotally supported about a swinging axle 43 to enable it to be swung between a retracted locked position I and an extended connection position II. A lever element 44 formed on one side of the handle is so arranged as to be capable of interacting with the head 30 of the hub bolt in order, in the locked position I, to make contact with a flat side part 44A loosely against a flat side part 30A of the head 30 of the hub bolt and, in the connection position II, to make contact firmly with a flat end part 44B against the flat head part 30A, which is forced into the aforementioned contact by the spring 35. In this way, the thickened part 33 is caused to be drawn into the internal space 45 of the main shaft 13, so that the balls 28 are forced radially outwards 46 into contact with a stop in the form of a bearing bolt 50 in the wheelchair 3, and so that the hub 4 is retained in position and the wheel 2 is rigidly secured. A frame part 39B, which is included in the actuating mechanism 39, is screwed securely to the outside of the wheel cover side 38 and is securely attached to the inner part 6 of the hub, and enables the wheel 2 to be lifted by the handle part 39A after detaching the wheel 2 from the wheelchair 3.

The planetary gear may be of a previously disclosed kind, and may consist of plastic material and metal material. One special solution, however, is for the ring wheel 12 to be rigidly attached to the inner part 6 of the hub via a number of projections 47 arranged around its periphery and matching recesses 48 between the parts 12,6, for example in the form of similar lugs. The balls 19 for the bearing may be steel balls in the form of hardened, ground ball bearing balls, and the grooves 17,18 may be milled grooves with a circular cross-sectional form.

The invention is not restricted to the illustrative examples described above and shown in the drawings, but may be modified within the scope of the Patent Claims without departing from the idea of invention.

I claim:

1. A wheelchair wheel hub (5), comprising: a planetary gear (4) having, a sun wheel (10), planet wheel and ring wheel (12); the hub (5) having a hub inner part (6) and a hub outer part (7), which parts are rotatably supported relative to one another, and are carried by a main shaft (13); the inner and outer hub parts (6, 7) are supported by means of supporting devices (14) acting around the periphery of the hub, which devices are so arranged to support the inner and outer hub parts (6, 7) radially relative to one another, and to provide axial (15) locking of the inner and outer hub parts (6, 7) relative to one another; the supporting device (14) is formed from a plurality of radial grooves (17, 18) extending around the periphery (16) of said inner and outer hub parts (6, 7); inside the radial grooves one of rolling devices (19) and a plain bearing component are arranged to act, in conjunction with the radial grooves (17, 18), arranged directly in line with one another on an internal envelope surface (2) of the outer part (7) of the hub and on an external envelope surface (8) of the inner part (6) of the hub when the inner and outer hub parts (6, 7) are assembled to form a wheelchair wheel hub (5).

2. The hub as claimed in claim 1, characterized in that a large number of balls (19) is so arranged in the aforementioned grooves (17, 18) as to be accommodated in order to roll in a long row and to function as a bearing and locking device.

3. The hub as claimed in claim 2, characterized in that pairs of grooves (17—17; 18—18) are arranged axially displaced from one another.

4. The hub as claimed in one or other of claims 1–3, characterized in that a passage (22) is present in the hub (5) to permit the insertion of the aforementioned rolling devices (19) or plain bearing component externally from outside the hub.

5. The hub as claimed in claim 4, characterized in that a hole (22) extends through the material (23) of the outer part (7) of the hub as far as the area (24) directly in line with one of the aforementioned grooves (18) therein.

6. The hub as claimed in claim 5, characterized in that the hole (22) is threaded (25) to enable it to accept a plug (26) therein, thereby closing the hole.

7. The hub as claimed in claim 6, characterized in that the hole (22) extends axially.

8. The hub as claimed in claim 2, characterized in that a passage is present in the hub to permit the insertion of the aforementioned rolling devices or plain bearing component externally from outside the hub.

9. The hub as claimed in claim 3, characterized in that a passage is present in the hub to permit the insertion of the aforementioned rolling devices or plain bearing component externally from outside the hub.

10. The hub as claimed in claim 1, characterized in that a flexible plastic rod is capable of being accommodated in the aforementioned grooves to form a sliding bearing between the parts of the hub.

* * * * *